United States Patent
Lim et al.

(10) Patent No.: US 9,426,015 B2
(45) Date of Patent: Aug. 23, 2016

(54) APPARATUS AND METHOD FOR SYMBOL MAPPING IN WIRELESS COMMUNICATION SYSTEM USING MULTI TONE FREQUENCY QUADRATURE AMPLITUDE MODULATION

(71) Applicant: Samsung Electronics Co., Ltd., Suwon-si, Gyeonggi-do (KR)

(72) Inventors: Chi-Woo Lim, Suwon-si (KR); Min Sagong, Suwon-si (KR); Sung-Nam Hong, Anyang-si (KR); Hyun-Kyu Yu, Suwon-si (KR); Kyung-Whoon Cheun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/209,122

(22) Filed: Mar. 13, 2014

(65) Prior Publication Data

US 2014/0269959 A1   Sep. 18, 2014

(30) Foreign Application Priority Data

Mar. 14, 2013  (KR) .................. 10-2013-0027570

(51) Int. Cl.
| | |
|---|---|
| *H04L 5/12* | (2006.01) |
| *H04L 27/36* | (2006.01) |
| *H04L 27/38* | (2006.01) |
| *H04L 27/10* | (2006.01) |
| *H04L 27/34* | (2006.01) |
| *H04L 27/26* | (2006.01) |

(52) U.S. Cl.
CPC ............ *H04L 27/362* (2013.01); *H04L 27/106* (2013.01); *H04L 27/2634* (2013.01); *H04L 27/3405* (2013.01); *H04L 27/38* (2013.01)

(58) Field of Classification Search
CPC ........... H04L 27/38; H04L 27/34; H04L 5/02; H03B 21/00
USPC ............ 375/261, 271–273, 298–300; 455/69; 329/304
See application file for complete search history.

(56) References Cited

U.S. PATENT DOCUMENTS

| | | | |
|---|---|---|---|
| 8,340,231 | B1 | 12/2012 | Lee |
| 2004/0131125 | A1* | 7/2004 | Sanderford et al. .......... 375/261 |
| 2005/0075103 | A1 | 4/2005 | Hikokubo et al. |
| 2005/0270171 | A1 | 12/2005 | Quintero et al. |
| 2008/0232492 | A1* | 9/2008 | Xiao et al. .................... 375/260 |
| 2009/0175184 | A1 | 7/2009 | Hyounhee |
| 2011/0014926 | A1* | 1/2011 | Baligh et al. ............... 455/452.2 |
| 2012/0045024 | A1 | 2/2012 | Cui et al. |
| 2013/0259164 | A1* | 10/2013 | Hui et al. ...................... 375/340 |
| 2014/0023009 | A1* | 1/2014 | Abe et al. ...................... 370/329 |
| 2014/0198749 | A1* | 7/2014 | Luo ..................... H04W 72/042 370/329 |

* cited by examiner

*Primary Examiner* — Daniel Washburn
*Assistant Examiner* — Fitwi Hailegiorgis
(74) *Attorney, Agent, or Firm* — Jefferson IP Law, LLP

(57) ABSTRACT

A method of operating a base station in a wireless communication system supporting Frequency-Quadrature Amplitude Modulation (FQAM) and Multi-Tone FQAM (MT-FQAM) is provided. The method includes determining a modulation scheme of data to be transmitted, and modulating the data according to the determined modulation scheme, wherein if at least one resource block is included in the data and if the at least one resource block is mapped to at least one tone in a distributed manner, the MT-FQAM scheme is selected, or if one resource block is included in the data and if the one resource block is mapped to at least one tone in a continuous manner, the FQAM scheme is selected, or if multiple resource blocks are included in the data and if the multiple resource blocks are mapped to at least one tone in a continuous manner, the MT-FQAM scheme is selected.

26 Claims, 9 Drawing Sheets

QAM

MT-FSK

APPARATUS AND METHOD FOR SYMBOL MAPPING IN WIRELESS COMMUNICATION SYSTEM USING MULTI TONE FREQUENCY QUADRATURE AMPLITUDE MODULATION

CROSS-REFERENCE TO RELATED APPLICATION(S)

This application claims the benefit under 35 U.S.C. §119(a) of a Korean patent application filed on Mar. 14, 2013 in the Korean Intellectual Property Office and assigned Serial number 10-2013-0027570, the entire disclosure of which is hereby incorporated by reference.

TECHNICAL FIELD

The present disclosure relates to symbol mapping in a wireless communication system. More particularly, the present disclosure relates to symbol mapping in a wireless communication system that uses both Frequency-Quadrature Amplitude Modulation (FQAM) and Multi Tone-Frequency-QAM (MT-FQAM).

BACKGROUND

In general, a signal processing procedure for wireless communication consists of channel coding, modulation, frequency up-conversion, and transmission in a transmitting side. In accordance therewith, signal processing in a receiving side consists of frequency down-conversion, demodulation, and channel decoding. Herein, the demodulation in the receiving side includes a procedure of calculating a per-bit or per-symbol decoding metric.

To generate the decoding metric, it is necessary to premise a specific probability distribution for an interference and noise signal. Techniques of the related art assume a Gaussian distribution for an interference signal to perform decoding with a low complexity. Therefore, a Quadrature Amplitude Modulation (QAM)-series modulation scheme is primarily used in order for the interference signal to be similar to a Gaussian signal to the maximum extent possible.

However, it is generally known that a channel which assumes a non-Gaussian distribution has a greater channel capacity than a channel which assumes the Gaussian distribution. Therefore, if decoding is performed properly, the channel which assumes the non-Gaussian distribution can have a higher decoding performance in comparison with the channel which has the Gaussian distribution.

Accordingly, there is a need to develop a modulation scheme which allows an interference signal to be similar to the non-Gaussian distribution to the maximum extent possible, and as a result, a Frequency-QAM (FQAM) scheme is proposed. The FQAM method is a hybrid modulation scheme in which the QAM scheme is combined with a Frequency Shift Keying (FSK) scheme, and has advantages of the QAM scheme having a high spectral efficiency and the FSK scheme allowing an interference signal to have a non-Gaussian distribution.

The FQAM is further evolved to Multi Tone-FQAM (MT-FQAM) in which MT-FSK for expressing FSK symbols is combined with the QAM by using multi-tones of the symbol. Due to the multi-tones of the symbol, the MT-FQAM has a gain property superior to the FQAM. Such a gain property of the MT-FQAM is caused by a diversity effect of multi-tones constituting one MT-FSK symbol.

Accordingly, there is a need for an apparatus and a mapping for considering a diversity effect when mapping a tone of an MT-FQAM symbol to a frequency resource.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a symbol mapping method and apparatus in a wireless communication system using a MultiTone-Frequency-Quadrature Amplitude Modulation (MT-FQAM) scheme.

Another aspect of the present disclosure is to provide a method and apparatus for measuring non-Gaussian information of a channel in a wireless communication system using an MT-FQAM scheme.

Another aspect of the present disclosure is to provide a method and apparatus for symbol mapping to a tone of an MT-FQAM symbol by considering non-Gaussian information of a channel in a wireless communication system using an MT-FQAM scheme.

Another aspect of the present disclosure is to provide a method and apparatus for determining whether to use an MT-FQAM scheme and an FQAM scheme according to whether at least one resource block in a data region is mapped to at least one tone in a continuous or distributed manner in a wireless communication system using both the FQAM scheme and the MT-FQAM scheme.

In accordance with an aspect of the present disclosure, a method of operating a base station in a wireless communication system supporting FQAM and MT-FQAM is provided. The method includes determining a modulation scheme of data to be transmitted, and modulating the data according to the selected modulation scheme, wherein if at least one resource block is included in the data and if the at least one resource block is mapped to at least one tone in a distributed manner, the MT-FQAM scheme is selected, if one resource block is included in the data and if the one resource block is mapped to at least one tone in a continuous manner, the FQAM scheme is selected, and if multiple resource blocks are included in the data and if the multiple resource blocks are mapped to at least one tone in a continuous manner, the MT-FQAM scheme is selected.

In accordance with another aspect of the present disclosure, a method of operating a terminal in a wireless communication system supporting FQAM and MT-FQAM is provided. The method includes demodulating a signal according to a demodulation scheme corresponding to a modulation scheme of the signal received from a base station between the FQAM scheme and the MT-FQAM scheme, determining channel quality information of a first region of the signal, determining non-Gaussian information of a second region of the signal, and transmitting the channel quality information of the first region and the non-Gaussian information of the second region to the base station.

In accordance with another aspect of the present disclosure, a base station apparatus in a wireless communication system supporting FQAM and MT-FQAM is provided. The base station apparatus includes a backhaul communication module configured to communicate with a different base station, a Radio Frequency (RF) processor for transmitting data, and a modem configured to determine a modulation scheme of the data to be transmitted, and to modulate the data according to the determined modulation scheme, wherein the modem selects the MT-FQAM if at least one resource block is included in the data and if the at least one resource block is mapped to at least one tone in a distributed manner, selects the FQAM scheme if one resource block is included in the data and if the one resource block is mapped to at least one tone in a continuous manner, and selects the MT-FQAM scheme if multiple resource blocks are included in the data and if the multiple resource blocks are mapped to at least one tone in a continuous manner.

In accordance with another aspect of the present disclosure, a terminal apparatus supporting FQAM and MT-FQAM is provided. The terminal apparatus includes an RF processor configured to receive a signal from a base station, and a modem configured to demodulate the signal according to a demodulation scheme corresponding to a modulation scheme of the received signal between the FQAM scheme and the MT-FQAM scheme, to determine channel quality information of a first region of the signal, and to determine non-Gaussian information of a second region of the signal via the RF processor.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure described hereinafter relates to a method and apparatus for symbol mapping in a wireless communication system which uses both Frequency-Quadrature Amplitude Modulation (FQAM) and MultiTone-Frequency-QAM (MT-FQAM).

Figure 1C:
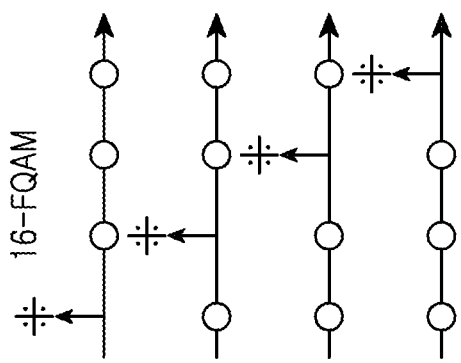
FIGS. 1A, 1B, and 1C illustrate the concept of a Frequency-Quadrature Amplitude Modulation (FQAM) scheme according to an embodiment of the present disclosure.
Figure 1B:
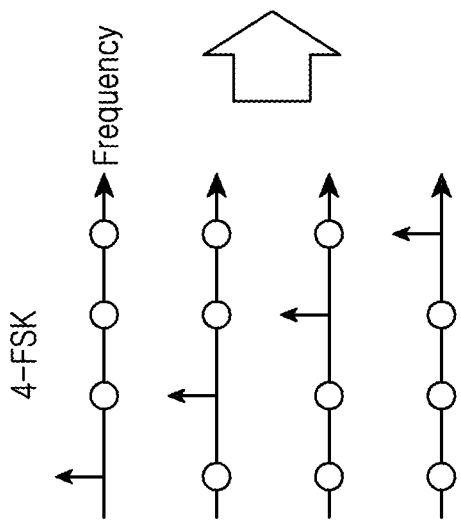
Figure 1A:
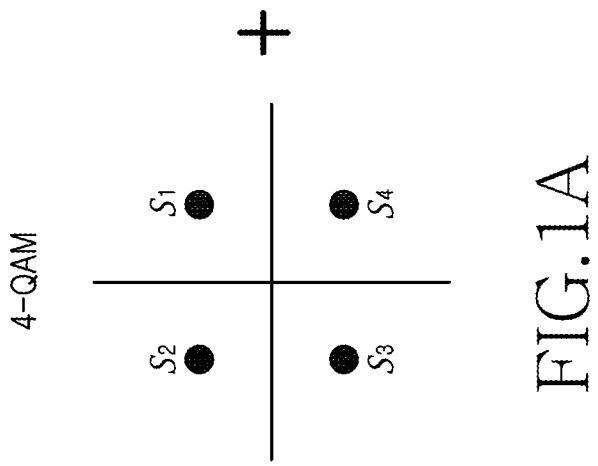

FIGS. 1A, 1B, and 1C illustrate the concept of an FQAM scheme according to an embodiment of the present disclosure. The FQAM scheme of FIGS. 1A to 1C is a scheme in which 4-Quadrature Amplitude Modulation (QAM) and 4-Frequency Shift Keying (FSK) are combined.

Referring to FIGS. 1A to 1C, 4-QAM of FIG. 1A has four constellation points in an orthogonal coordinate, and thus can generate four complex symbols, each having a different phase. 4-FSK of FIG. 1B uses four frequency values, and thus can generate four complex symbols each having a different frequency. The FQAM of FIG. 1C is a combination of the 4-QAM and the 4-FSK. As illustrated in FIG. 1C, since FQAM symbols can have four different frequency values and can simultaneously have four phase values, 16 symbols can be generated in total.

As such, by providing the ability to determine to which frequency a QAM symbol will be mapped, the FQAM extends the number of bit-streams that can be expressed only with the QAM by the number of frequencies. In other words, by using a phase and size of an FSK symbol, the FQAM extends the number of bit-streams that can be expressed only with the FSK by the number of QAM symbols. That is, the FQAM symbol is identified with a combination of a phase and size of the symbols and a location on a frequency to which the symbol is mapped.

Figure 2:
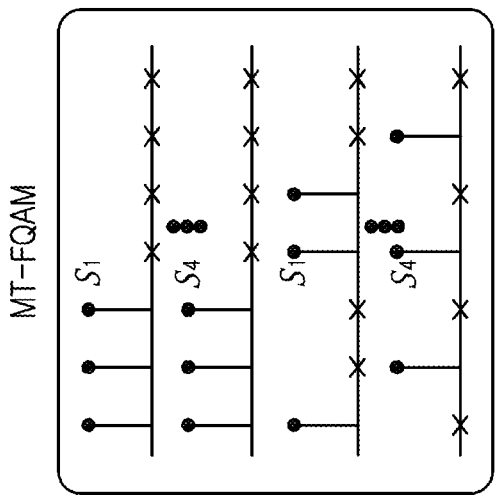
FIG. 2 illustrates the concept of a MultiTone-Frequency-QAM (MT-FQAM) scheme according to an embodiment of the present disclosure.
Figure 2:
Figure 2:
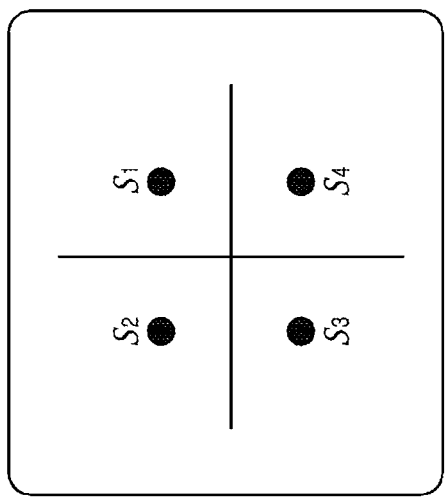
Figure 2:
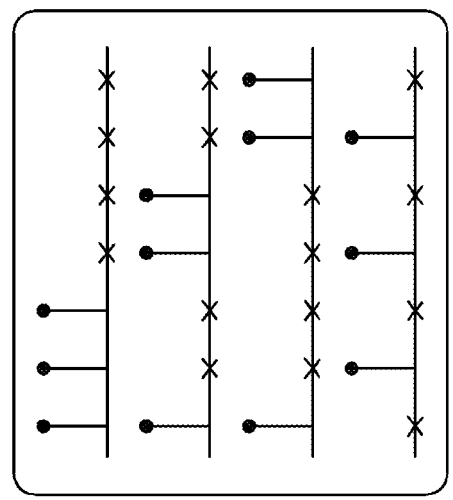

FIG. 2 illustrates the concept of a MT-FQAM scheme according to an embodiment of the present disclosure.

Referring to FIG. 2, the MT-FQAM differs from FQAM in that MT-FSK is used. The MT-FSK is FSK which uses multi-tones. The MT-FSK expresses one FSK symbol by using multi-tones.

The MT-FQAM has a gain property superior to the FQAM due to the use of multi-tones. Such a gain property of the MT-FQAM is caused by a diversity effect of multi-tones constituting one MT-FSK symbols. In addition, the MT-FQAM scheme may have a smaller granularity when configuring a modulation symbol.

An order of the FQAM is determined only with a combination of MF and MQ, whereas an order of the MT-FQAM is determined only with a combination of MTF and MQ. Herein, the MTF denotes an order of multi-tones. Since a resource block of a data region in the MT-FQAM is mapped to a tone, there is a need to consider the aforementioned diversity when mapping is performed. This is because a performance can be improved only when a diversity gain can be acquired between multi-tones constituting the resource block.

When the FQAM is used, a terminal can feed back additionally required non-Gaussian information to a base station. That is, the terminal can transmit a metric (e.g., $\alpha$, $\beta$, kurtosis, etc.) capable of measuring non-Gaussian information of a channel to the base station by adding the metric to channel quality information (e.g., Signal to Interference plus Noise Ratio (SINR)).

When the terminal measures the non-Gaussian information of the channel by using only a small number of pilot signals, non-Gaussianization is not properly represented. Therefore, there is a need to measure the non-Gaussian information in a data region of a channel which experiences an actual interference. For this, the data region for determining the non-Gaussian information must be preferentially allocated.

The terminal can receive a pilot signal in a typical manner during a feedback period in which data is not received, and can measure reception quality of the pilot signal and feed back channel quality information by assuming a state (e.g., $\alpha=2$) in which non-Gaussianization is not present.

The terminal can measure non-Gaussianization of a determined region in a whole region of received data during the feedback period in which the data is received, and can feed it back together with the channel quality information.

In other words, if the terminal measures the non-Gaussianization of the channel by using only the small number of pilot signals, its accuracy is significantly low and thus performance deterioration is expected. Therefore, a measurement in the data region is required to measure the non-Gaussianization of the channel. That is, a data region which may have a certain level of accuracy must be defined to measure the non-Gaussianization of the channel.

Information on such a data region must be directly/indirectly reported by the base station to the terminal. In general, channel quality information is fed back periodically in a downlink. Therefore, if the information on the data region defined by including an initial operation situation is not present, an existing reference signal (e.g., a pilot signal) is measured by assuming a state (i.e., $\alpha=2$) in which non-Gaussianization is not present, and channel quality information (e.g., SINR) is fed back.

In this case, the base station can recognize that there is a need to use the FQAM. In doing so, the base station can allocate a specific data region, measure non-Gaussianization for the region, and feed it back to the terminal. If the terminal can perform such an operation within a periodic feedback period, the non-Gaussianization is measured with respect to corresponding data and is fed back to the base station.

Meanwhile, in order for a non-Gaussianization level in the data region to be meaningful, a measurement time and an actual reception time must have a similar state. In order to have such a similarity, each base station needs to be configured such that the same data region continuously uses the FQAM. In addition, an accuracy for the non-Gaussianization level can be guaranteed only when an FSK modulation order (i.e., MF) is identical. The base station can determine a Modulation Coding Scheme (MCS) level of the terminal by considering both the channel quality information and information obtained by measuring the non-Gaussianization.

A procedure of obtaining the values $\alpha$ and $\beta$ in a metric (e.g., $\alpha$, $\beta$, kurtosis, etc.) capable of measuring non-Gaussian information can be described as follows in the present disclosure.

A Complex Generalized Gaussian (CGG) decoding scheme is a representative scheme among the non-Gaussian decoding schemes of the related art. It is assumed in the CGG decoding scheme that an interference signal or noise conforms to a CGG distribution. Since the CGG decoding scheme includes the Gaussian decoding scheme, the present disclosure describes the CGG decoding scheme. A probability density function of the CGG distribution is expressed by Equation (1) below.

$$f_{\hat{z}}(z \mid \alpha, \beta) = \frac{\alpha}{2\pi\beta^2 \Gamma\left(\frac{2}{\alpha}\right)} \exp\left(-\left(\frac{|z|}{\beta}\right)^\alpha\right) \qquad \text{Equation (1)}$$

In Equation (1) above, $f_{\hat{z}}$ denotes a probability density function of a noise, z denotes a variable indicating the noise, $\alpha$ denotes a non-Gaussian level as a shape parameter, $\beta$ denotes a variance as a scale parameter, and $\Gamma$ denotes a gamma function defined as $\Gamma(z) \triangleq \int_0^\infty t^{z-1} \exp(-t)\, dt$.

In Equation (1) above, the probability density function of the CGG distribution conforms to a Gaussian distribution if $\alpha$ is 2, conforms to a super Gaussian distribution having a heavy-tail if $\alpha$ is less than 2, and conforms to a sub Gaussian distribution having a light-tail if $\alpha$ is greater than 2. That is, if $\alpha$ is 2, the CGG decoding scheme is the same as the Gaussian decoding scheme.

In case of the FQAM, one symbol occupies multi-tones unlike the QAM. Therefore, the present disclosure can calculate a probability density function for a Gaussian or non-Gaussian symbol for the FQAM as expressed by Equation (2) below.

$$f_{Y[k]}(y[k] \mid \hat{H}_1[k], m_1[k], s_1[k]) = \qquad \text{Equation (2)}$$
$$\prod_{l=0}^{M_F-1} f_{Y_l[k]}(y_l[k] \mid \hat{H}_{1,l}[k], m_1[k], s_1[k])$$

In Equation (2) above, $f_{Y[k]}(\ )$ denotes a probability density function of a $k^{th}$ Transmit (Tx) symbol, y[k] denotes a Receive (Rx) signal corresponding to the $k^{th}$ Tx symbol, $\hat{H}[k]$ denotes an estimation value of a channel coefficient for the $k^{th}$ Tx symbol, m[k] denotes a number assigned to a tone on which a QAM symbol is carried in a $k^{th}$ FQAM block, s[k] denotes a QAM symbol of the $k^{th}$ Tx symbol, $f_{Y_l[k]}$ denotes a probability density function of the $k^{th}$ Tx symbol, $y_l[k]$ denotes an Rx signal corresponding to the $k^{th}$ Tx symbol in an $1^{st}$ tone, and $\hat{H}_l[k]$ denotes an estimation value of a channel coefficient for the $k^{th}$ Tx symbol in the $1^{st}$ tone. This can be expressed again as Equation (3) below.

$$f_{Y_l[k]}(y_l[k] \mid \hat{H}_l[k], m[k], s[k]) = \qquad \text{Equation (3)}$$
$$\frac{\alpha}{2\pi\beta^2 \Gamma(2/\alpha)} \exp\left(-\left(\frac{\left|y[k] - \hat{H}_l[k]s[k]\delta_{l,m[k]}\right|}{\beta}\right)^\alpha\right)$$

In Equation (3) above, $f_{Y[k]}$ denotes a probability density function of a $k^{th}$ Tx symbol in an $1^{st}$ tone, $y_i[k]$ denotes an Rx signal corresponding to the $k^{th}$ Tx symbol in the $1^{st}$ tone, $\hat{H}_l[k]$ denotes an estimation value of a channel coefficient for the $k^{th}$ Tx symbol in the $1^{st}$ tone, m[k] denotes a number assigned to a tone on which a QAM symbol is carried in a $k^{th}$ FQAM block, s[k] denotes a QAM symbol of the $k^{th}$ Tx symbol, $\alpha$ denotes a shape parameter, $\beta$ denotes a scale parameter, $\Gamma$ denotes a gamma function defined as $\Gamma(z) \triangleq \int_0^\infty t^{z-1} \exp(-t)\,dt$, and $\delta_{l,m[k]}$ denotes a delta function which returns 1 if l is equal to m[k], and otherwise 0.

Most non-Gaussian decoding schemes include a multiplier calculation of the shape parameter $\alpha$. Since $\alpha$ is an integer value greater than 0, in general, a complexity for calculating the multiplier $\alpha$ is significantly great. Since actual interference signals or noises conform to a super Gaussian distribution having a heavy-tail in most cases, the shape parameter $\alpha$ of the non-Gaussian distribution (e.g., CGG, Generalized Gaussian (GG), Symmetric alpha Stable (SaS)) has a value in the range of 0 to 2.

Regarding most interference signals and noises, modeling is achieved with a super Gaussian distribution of which the value $\alpha$ is in the range of 0 to 2 or is achieved with a Gaussian distribution. The value $\beta$ called a scale parameter performs the same role as a variance of a Gaussian probability density function.

Probability density functions used in most non-Gaussian decoding schemes include a shape parameter and a scale parameter, for example, $\alpha$ and $\beta$ of the CGG distribution. Therefore, although the CGG is described as an example in the present disclosure, it is apparent that the present disclosure is also applicable to most existing non-Gaussian decoding schemes.

There are various methods of estimating the values $\alpha$ and $\beta$. Hereinafter, the present disclosure describes a method of taking a moment matching scheme which has already been proposed for example. According to the moment matching scheme, the values $\alpha$ and $\beta$ are estimated by matching a primary moment and a secondary moment. The values $\alpha$ and $\beta$ are expressed by Equation (4) below.

$$\alpha = \frac{\ln(3^6/2^{10})}{\ln\left(\frac{(E[|\hat{J}_l[k]|])^2/E[|\hat{J}_l[k]|^2]-}{\frac{\pi}{4}+\frac{9}{2^{3.5}}}\right)+\ln\left(\frac{3}{2\sqrt{2}}\right)} \quad \text{Equation (4)}$$

$$\hat{J}_l[k] = y_l[k] - \hat{H}_{1,l}[k]\hat{s}_l[k]\delta_{l,m[k]}$$

$$\beta = \frac{\Gamma(2/\alpha)}{\Gamma(3/\alpha)}E[|\hat{J}_l[k]|]$$

In Equation (4) above, $\alpha$ denotes a shape parameter, $\beta$ denotes a scale parameter, y[k] denotes an Rx signal corresponding to a $k^{th}$ Tx symbol, $\hat{H}[k]$ denotes an estimation value of a channel coefficient for the $k^{th}$ Tx symbol, $\hat{s}[k]$ denotes the $k^{th}$ Tx symbol estimated in a hard decision manner, and $\Gamma$ denotes a gamma function defined as $\Gamma(z) \triangleq \int_0^\infty t^{z-1} \exp(-t)\,dt$.

Figure 3A:
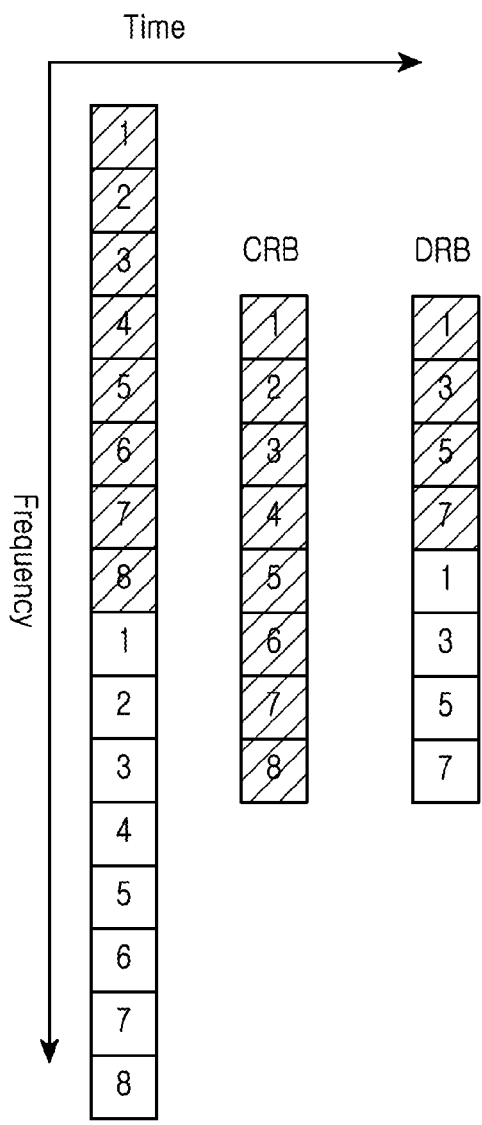
FIGS. 3A and 3B illustrate a symbol mapping procedure in an MT-FQAM scheme according to an embodiment of the present disclosure.
Figure 3B:
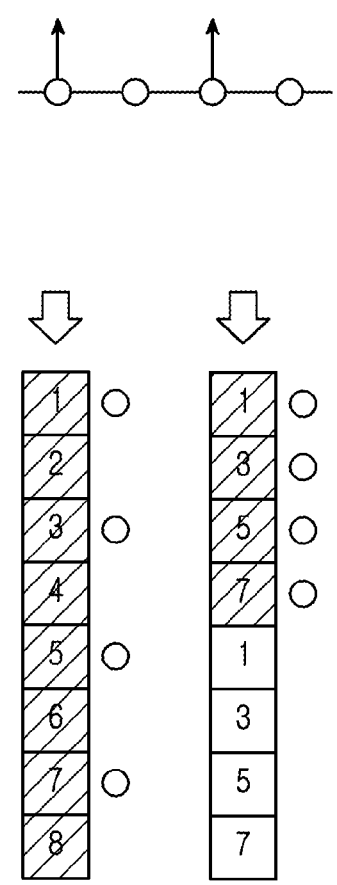

FIGS. 3A and 3B illustrate a symbol mapping procedure in an MT-FQAM scheme according to an embodiment of the present disclosure.

Referring to FIG. 3A, a diversity for tones of each symbol must be guaranteed to use the MT-FQAM scheme. That is, a channel of the tones of each symbol must be independent and identically distributed (i.i.d). In addition, Resource Blocks (RBs) can be classified into a Continuous Resource Block (CRB) and a Distributed Resource Block (DRB) according to a configuration scheme. The RB is a unit representing a logical resource in a data region (or a data burst). In FIG. 3A, a case where tones of a symbol to be mapped are continuous (i.e., 1-8) and a case where the tones thereof are distributed (i.e., (1,3,5,7), (1,3,5,7)) are illustrated with respect to a specific RB.

For this, as illustrated in FIG. 3B, when using a CRB in which RBs are mapped to continuous tones, as in a case shown in the left side, tones of an MT-FQAM symbol must be mapped such that the tones are separated as far as possible along a frequency axis in an allocated resource. In addition, when using a DRB in which RBs are mapped to distributed tones as in a case shown in the right side, the RBs must be mapped continuously for the tones of the MT-FQAM symbol.

In the present disclosure, a base station can determine the FQAM scheme and the MT-FQAM scheme respectively according to which one is used between the CRB and the DRB in resource allocation and MCS determination. That is, the base station can determine the FQAM scheme in case of the CRB (further, in case of a single-RB), and can determine the MT-FQAM scheme in case of the DRB. In case of multi-RBs, the base station can select the MT-FQAM scheme even in case of the CRB.

In addition, the base station can have a smaller granularity in the use of a frequency resource when a modulation symbol is configured in case of using the MT-FQAM scheme. The MT-FQAM scheme can be determined by further sub-dividing a change of MF in the FQAM scheme.

The present disclosure selects the MT-FQAM scheme if at least one RB is present for data and the at least one RB is mapped to at least one tone in a distributed manner, and selects the FQAM scheme if one RB is present for the data and the at least one RB is mapped to at least one tone in a continuous manner. In addition, the present disclosure selects the MT-FQAM scheme if multiple RBs are present for the data and the multiple RBs are mapped to at least one tone in a continuous manner.

Table 1 below shows a difference of an MF order for a modulation symbol configuration in the FQAM scheme and the MT-FQAM scheme. The MT-FQAM scheme shows that the change of MF in the FQAM scheme is further sub-divided.

TABLE 1

| FQAM | | MT-FQAM | | |
|---|---|---|---|---|
| MF | MQ | MF | MTF | MQ |
| 2 | 8 | 3 | 2 | 8 |
| 4 | 4 | 5 | 4 | 4 |
| 8 | 2 | 6 | 4 | 4 |
| | | 7 | 4 | 4 |
| | | 9 | 8 | 2 |

Figure 4:
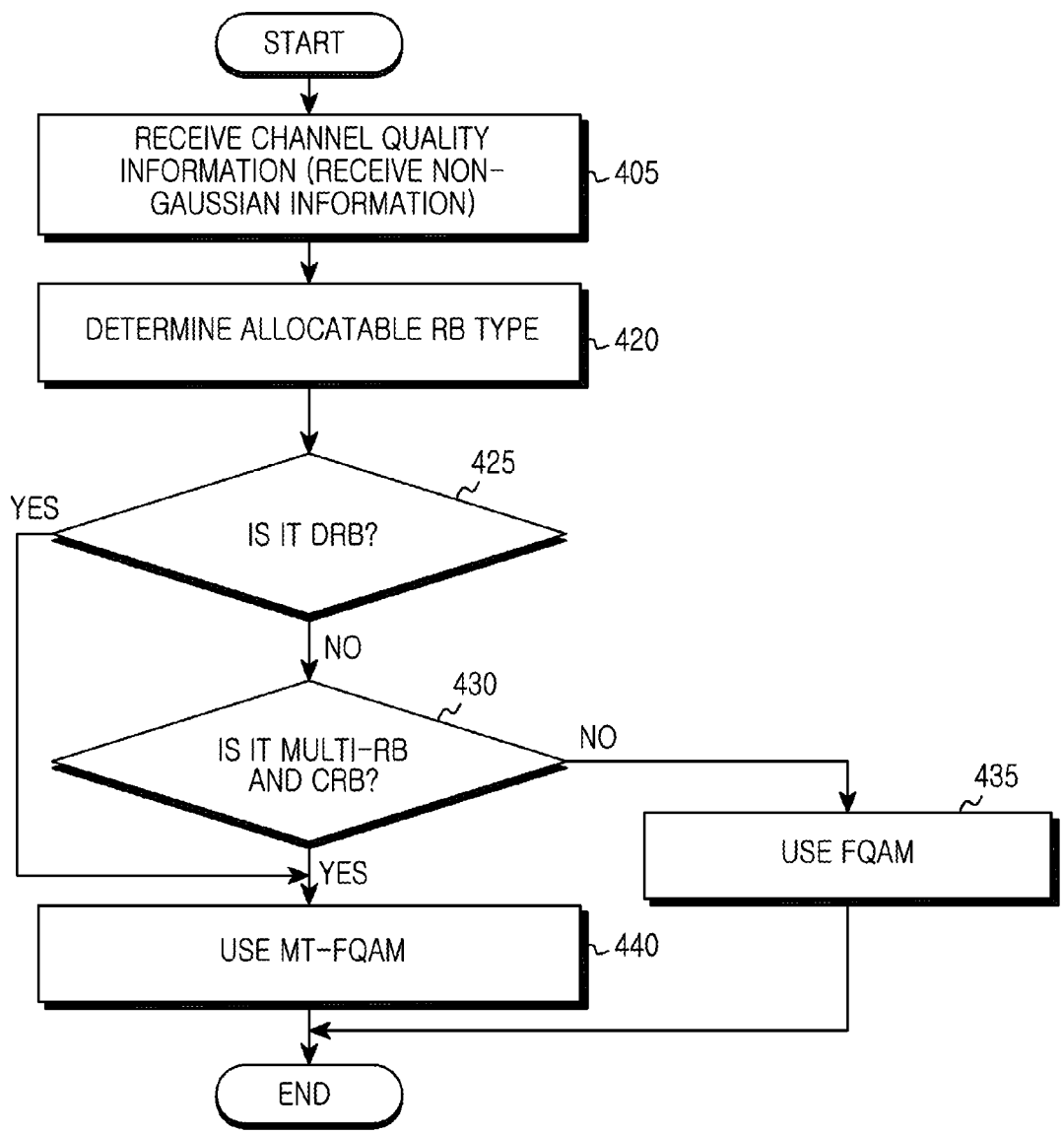
FIG. 4 is a flowchart illustrating a procedure of determining a modulation scheme based on a mapping scheme according to an embodiment of the present disclosure.

FIG. 4 is a flowchart illustrating a procedure of determining a modulation scheme based on a mapping scheme according to an embodiment of the present disclosure.

Referring to FIG. 4, a base station receives channel quality information from a terminal. The base station can receive non-Gaussian information added to the channel quality information to indicate a non-Gaussian level of a channel state measured by the terminal at operation 405.

The base station determines a type of an RB that can be allocated to the terminal at operation 420. If the determined RB is a DRB at operation 425, the base station determines to use the MT-FQAM at operation 440. If the determined RB is the DRB, whether the RB is a multi-RB or not is not considered in the present disclosure.

If the determined RB is not the DRB at operation 425, and if the determined RB is a multi-RB and is a CRB at operation 430, the base station determines to use the MT-FQAM scheme at operation 440.

If the determined RB is not the multi-RB and is the CRB at operation 430, that is, if the determined RB is a single-RB and is the CRB, the base station determines to use the FQAM scheme at operation 435.

Figure 5:
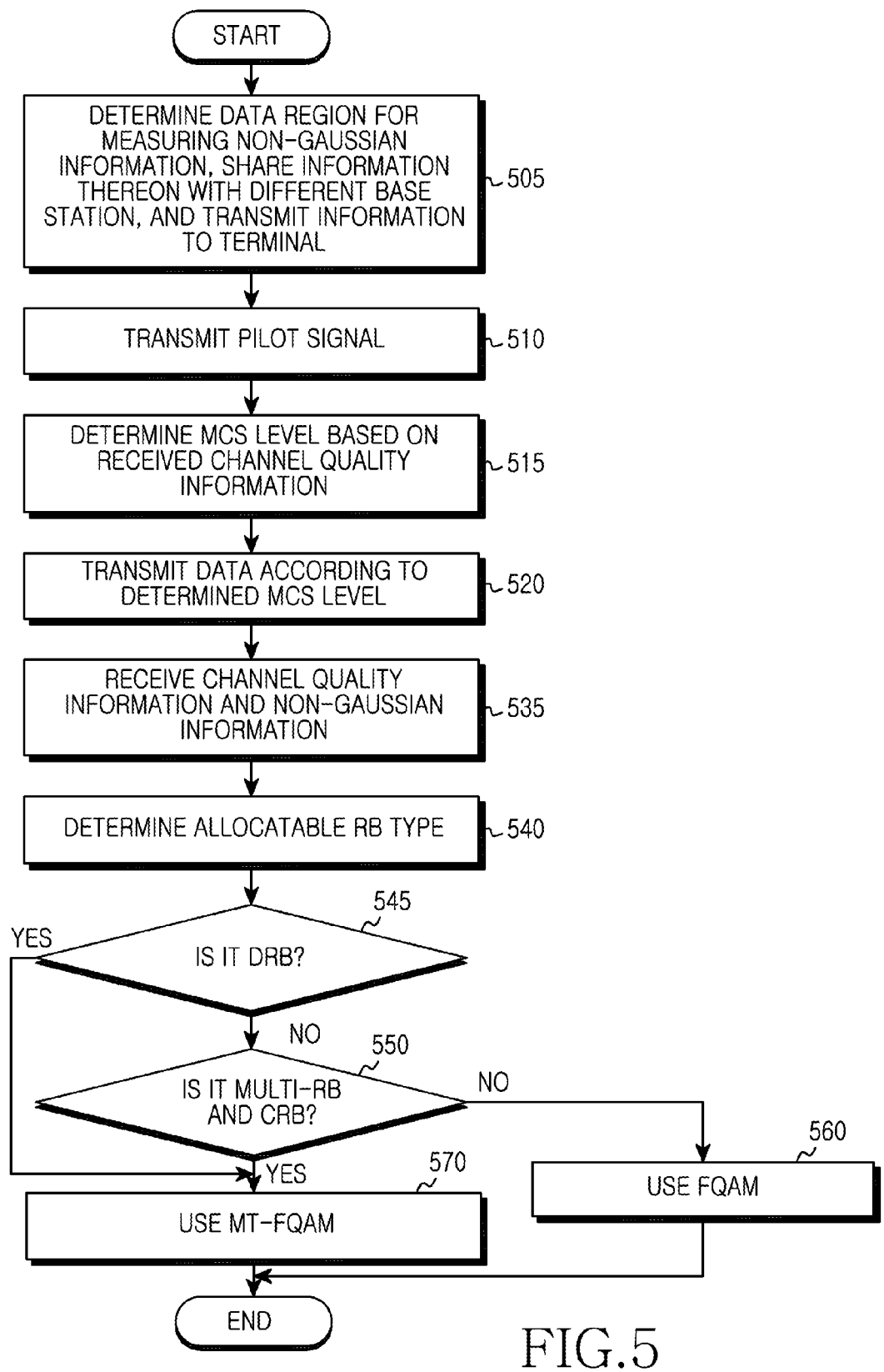
FIG. 5 is a flowchart illustrating a procedure of operating a base station according to an embodiment of the present disclosure.

FIG. 5 is a flowchart illustrating a procedure of operating a base station according to an embodiment of the present disclosure.

Referring to FIG. 5, the base station determines a data region in which a terminal measures non-Gaussian information, shares information thereon with a different base station, and transmits the information to the terminal at operation 505.

In the present disclosure, any base station can determine the data region for measuring the non-Gaussian information. In addition, the base station can determine any data region, or determine a data region which applies non-Gaussianization in a most appropriate manner by using a statistic value and a measurement value. In addition, it is apparent that there is no restriction on a method in which the base station determines the data region for measuring the non-Gaussian information.

Thereafter, the base station transmits a pilot signal to the terminal at operation 510. The pilot signal is an example of a reference signal transmitted by the base station to the terminal.

The base station receives channel quality information (e.g., SINR) from the terminal, and determines a Modulation and Coding Scheme (MCS) level for the terminal on the basis of the channel quality information at operation 515.

The base station performs modulation and coding according to the determined MCS level, and transmits data to the terminal at operation 520.

The base station receives the channel quality information and non-Gaussian information from the terminal at operation 535.

The base station determines a type of an allocatable RB at operation 540. If the determined RB is a DRB at operation 545, the base station determines to use the MT-FQAM scheme at operation 570.

If the determined RB is not the DRB at operation 545 and if the determined RB is a multi-RB and is a CRB at operation 550, the base station determines to use the MT-FQAM scheme at operation 570.

If the determined RB is not the multi-RB and is the CRB at operation 550, the base station determines to use the FQAM scheme at operation 560.

Figure 6:
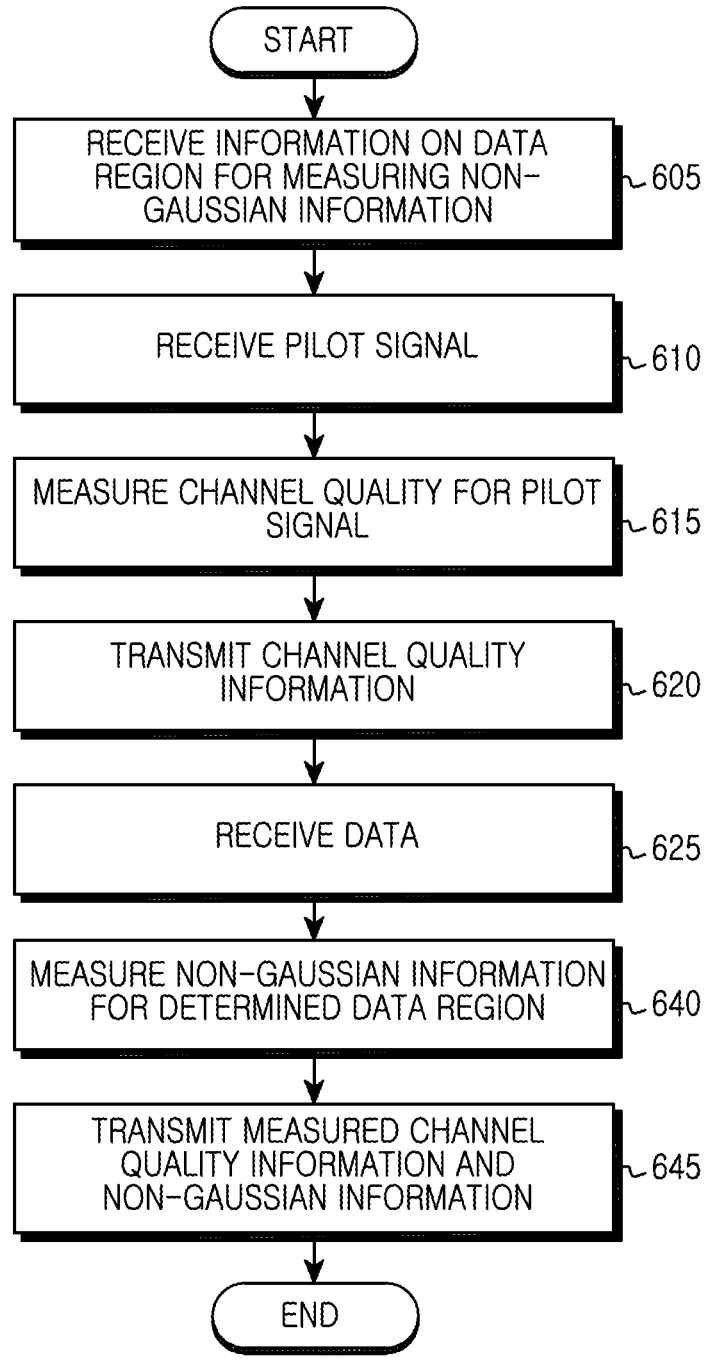
FIG. 6 is a flowchart illustrating a procedure of operating a terminal according to an embodiment of the present disclosure.

FIG. 6 is a flowchart illustrating a procedure of operating a terminal according to an embodiment of the present disclosure.

Referring to FIG. 6, the terminal receives information on a data region for measuring non-Gaussian information at operation 605. The information on the data region indicates the data region in which the terminal measures a non-Gaussianization level.

The terminal receives a pilot signal transmitted by a base station at operation 610. The pilot signal is an example of a reference signal transmitted by the base station to the terminal.

At operation 615, the terminal measures channel quality for the pilot signal. The terminal generates channel quality information (e.g., SINR) and transmits it to the base station at operation 620.

At operation 625, the terminal receives data transmitted by the base station.

At operation 640, the terminal measures non-Gaussian information for the determined data region.

At operation 645, the terminal transmits the measured channel quality information and non-Gaussian information to the base station.

Figure 7:
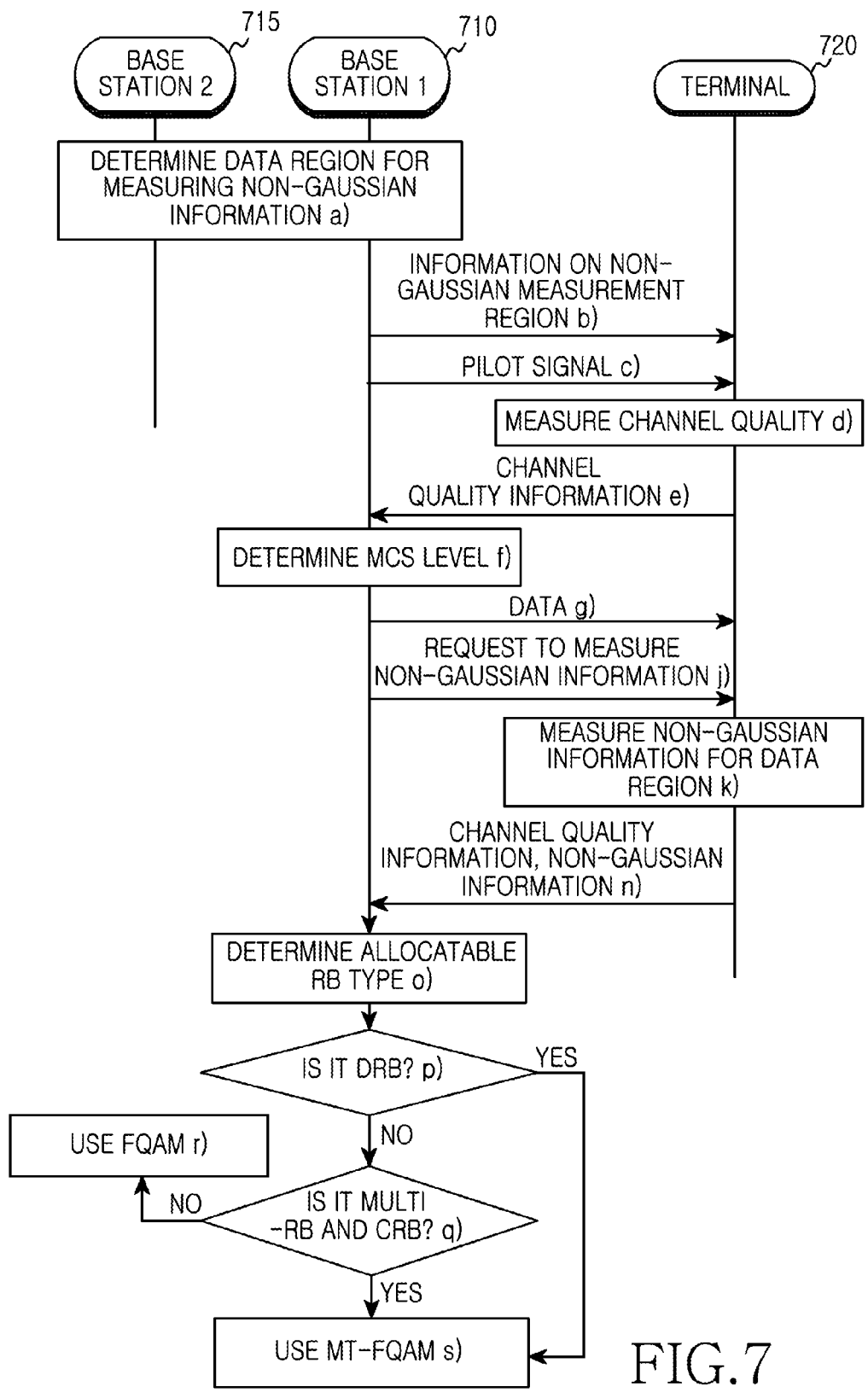
FIG. 7 illustrates a message flow between a base station and a terminal according to an embodiment of the present disclosure.

FIG. 7 illustrates a message flow between a base station and a terminal according to an embodiment of the present disclosure.

Referring to FIG. 7, a base station #1 710 determines a data region for measuring non-Gaussian information, and shares it with a base station #2 715 at operation a. Alternatively, the base station #2 715 can determine the data region for measuring the non-Gaussian information, and can share it with the base station #1 710.

In the present disclosure, any base station can determine the data region for measuring the non-Gaussian information. In addition, the base station can determine any data region, or determine a data region which applies non-Gaussianization in a most appropriate manner by using a statistic value and a measurement value. In addition, it is apparent that there is no restriction on a method in which the base station determines the data region for measuring the non-Gaussian information.

Thereafter, the base station #1 710 transmits information on the data region for measuring the determined non-Gaussian information to the terminal 720 at operation b. The terminal 720 receives the information on the data region for measuring the non-Gaussian information.

The base station #1 710 transmits a pilot signal to the terminal 720 at operation c, and the terminal 720 receives the pilot signal transmitted by the base station #1 710. The pilot signal is an example of a reference signal transmitted by the base station #1 710 to the terminal 720.

The terminal 720 measures channel quality for the pilot signal at operation d, and transmits generated channel quality information (e.g., SINR) to the base station #1 710 at operation e. The base station #1 710 receives the channel quality information from the terminal 720, and determines an MSC level on the basis of the channel quality information at operation f.

The base station #1 710 performs modulation and coding according to the determined MCS level and transmits data to the terminal 720 at operation g. The terminal 720 receives the data transmitted by the base station 710.

The base station #1 710 transmits a request for channel quality information and non-Gaussian information to the terminal 720 at operation j. The terminal 720 measures the channel quality information and the non-Gaussian information at operation k, and transmits the measured channel quality information and non-Gaussian information to the base station 710 at operation n. The base station #1 710 receives the channel quality information and the non-Gaussian information from the terminal 720.

The base station #1 710 determines an allocatable RB type at operation o. If the determined RB is a DRB at operation p, the base station determines to use the MT-FQAM scheme at operation s.

If the determined RB is not the DRB at operation p, and if the determined RB is a multi-RB and a CRB at operation q, the base station determines to use the MT-FQAM scheme at operation s.

If the determined RB is not the multi-RB and is the CRB at operation q, the base station determines to use the FQAM scheme at operation r.

Figure 8:
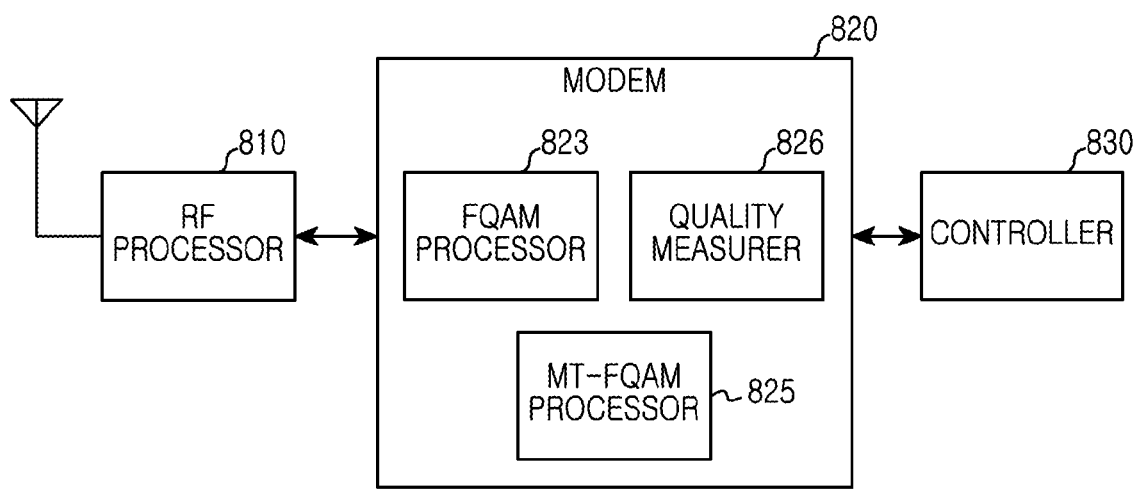
FIG. 8 is a block diagram illustrating a structure of a terminal according to an embodiment of the present disclosure.

FIG. 8 is a block diagram illustrating a structure of a terminal according to an embodiment of the present disclosure.

Referring to FIG. 8, the terminal includes a Radio Frequency (RF) processor 810, a modem 820, and a controller 830.

The RF processor 810 performs a function for transmitting and receiving a signal through a wireless channel by performing signal band conversion, amplification, etc. That is, the RF processor 810 up-converts a baseband signal provided from the modem 820 into an RF signal, and transmits the RF signal through an antenna, and also down-converts an RF signal received through the antenna into a baseband signal. For example, the RF processor 810 can include an amplifier, a mixer, an oscillator, a Digital to Analog Converter (DAC), an Analog to Digital Converter (ADC), etc. Although only one antenna is illustrated in FIG. 8, the terminal can have multiple antennas.

The modem 820 performs a conversion function between a baseband signal and a bit-stream according to a physical layer protocol of the system. For example, in case of conforming to an Orthogonal Frequency Division Multiplexing (OFDM) scheme, in a data transmission process, the modem 820 generates complex symbols by performing coding and modulation on a transmitted bit-stream, maps the complex symbols to subcarriers, and configures OFDM symbols by performing an Inverse Fast Fourier Transform (IFFT) operation and a Cyclic Prefix (CP) insertion operation. In addition, in a data reception process, the modem 820 splits the baseband signal provided from the RF processor 810 on an OFDM symbol basis, restores signals mapped to the subcarriers by using a Fast Fourier Transform (FFT) operation, and restores a received bit-stream by performing demodulation and decoding.

For example, according to an embodiment of the present disclosure, the modem 820 includes an FQAM processor 823 for modulating/demodulating and coding/decoding an FQAM symbol and an MT-FQAM processor 825 for modulating/demodulating and coding/decoding an MT-FQAM symbol.

In addition, the modem 820 includes a quality measurer 826 which receives information on the data region used to determine non-Gaussian information transmitted by the base station and which determines the non-Gaussian information for the data region and transmits it to the base station.

The controller 830 provides an overall control to the terminal. For example, the controller 830 transmits and receives a signal via the modem 820 and the RF processor 810. In addition, the controller 830 determines a configuration required for demodulation and decoding of the modem 820. The controller 830 can include at least one processor.

Figure 9:
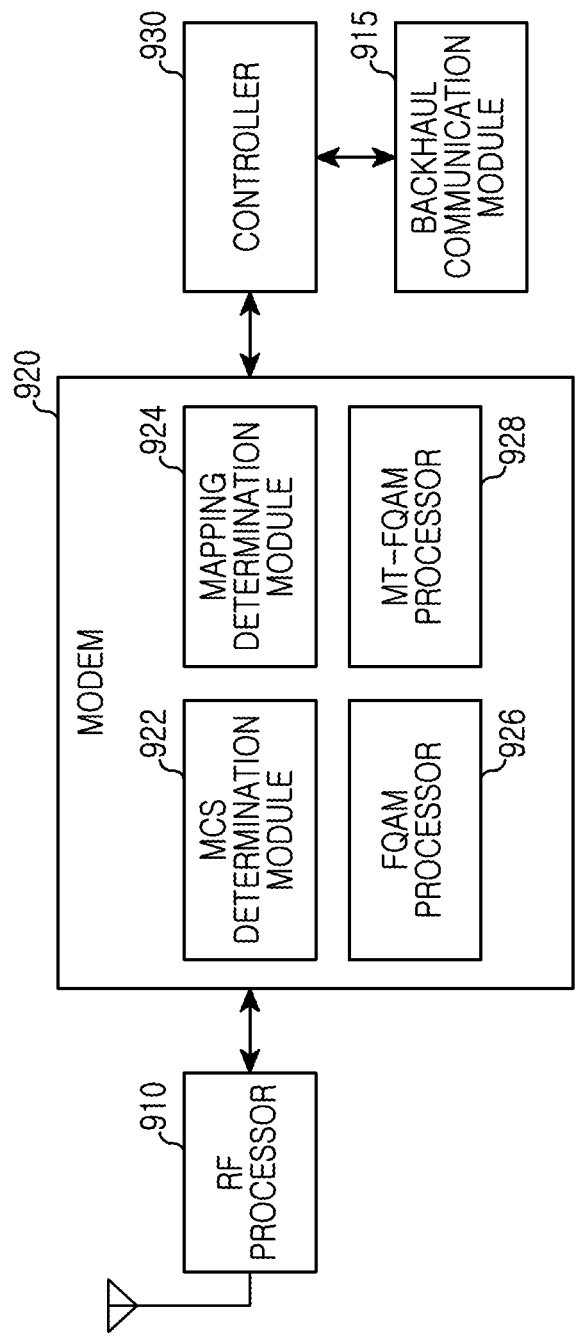
FIG. 9 is a block diagram illustrating a structure of a base station according to an embodiment of the present disclosure.

FIG. 9 is a block diagram illustrating a structure of a base station according to an embodiment of the present disclosure.

Referring to FIG. 9, the base station includes an RF processor 910, a backhaul communication module 915, a modem 920, and a controller 930.

The RF processor 910 performs a function for transmitting and receiving a signal through a wireless channel by performing signal band conversion, amplification, etc. That is, the RF processor 910 up-converts a baseband signal provided from the modem 920 into an RF signal, transmits the RF signal through an antenna, and also down-converts an RF signal received through the antenna into a baseband signal. For example, the RF processor 910 can include an amplifier, a mixer, an oscillator, a DAC, an ADC, etc. Although only one antenna is illustrated in FIG. 9, the base station can have multiple antennas.

The backhaul communication module 915 provides the controller 930 with an interface for exchanging information with a different base station. That is, the controller 930 exchanges the information with the different base station via the backhaul communication module 915.

The modem 920 performs a conversion function between a baseband signal and a bit-stream according to a physical layer protocol of the system. For example, in case of conforming to an OFDM scheme, in a data transmission process, the modem 920 generates complex symbols by performing coding and modulation on a transmitted bit-stream, maps the complex symbols to subcarriers, and configures OFDM symbols by performing an IFFT operation and a CP insertion operation. In addition, in a data reception process, the modem 920 splits the baseband signal provided from the RF processor 910 on an OFDM symbol basis, restores signals mapped to the subcarriers by using a FFT operation, and restores a received bit-stream by performing demodulation and decoding.

For example, according to an embodiment of the present disclosure, the modem 920 includes an FQAM processor 926 for modulating/demodulating and coding/decoding an FQAM symbol and an MT-FQAM processor 928 for modulating/demodulating and coding/decoding an MT-FQAM symbol. In addition, the modem 920 includes an MCS determination module 922. The MCS determination module 922 receives the non-Gaussian information and channel quality information transmitted by the terminal, recognizes non-Gaussianization in a data region, and determines an MCS level by considering the non-Gaussianization. In addition, the modem 920 includes a mapping determination module 924. According to an RB in use, the mapping determination module 924 determines to use the MT-FQAM scheme if the RB is a DRB, and determines to use the FQAM scheme if the RB is not a multi-RB and is a CRB. The mapping determination module 924 determines to use the MT-FQAM scheme if the RB is the multi-RB and is the CRB.

The MCS determination module 922 transmits the determined MCS level to the terminal and performs modulation and coding on data according to the determined MCS level, determines a data region in which the terminal determines the non-Gaussian information to transmit it to a different base station via the backhaul communication module 915, and transmits it to the terminal via the RF processor 910.

That is, the MCS determination module 922 determines an FQAM scheme used in the present disclosure or a modulation order (i.e., MF, MQ, MTF, etc.) in the FQAM scheme on the basis of the channel quality information transmitted by the terminal.

The controller 930 provides an overall control to the terminal. For example, the controller 930 transmits and receives a signal via the modem 920 and the RF processor 910. Further, the controller 930 determines a configuration required for modulation/demodulation and coding/decoding of the modem 920. The controller 930 can include at least one processor.

Methods based on the various embodiments disclosed in the claims and/or specification of the present disclosure can be implemented in hardware, software, or a combination of both.

When implemented in software, computer readable recording medium for storing one or more programs (i.e., software modules) can be provided. The one or more programs stored in the computer readable recording medium are configured for execution performed by one or more processors in the electronic device. The one or more programs include instructions for allowing the electronic device to execute the methods based on the various embodiments disclosed in the claims and/or specification of the present disclosure.

The program (i.e., the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program can be stored in a memory configured in combination of all or some of these storage media. In addition, the configured memory can be plural in number.

Further, the program can be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device can access via an external port to the electronic device. In addition, an additional storage device on a communication network can access to the portable electronic device.

The present disclosure provides a tone mapping method for a resource block of a data region in a wireless communication system using FQAM and MT-FQAM to improve a system performance.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of operating a base station in a wireless communication system, the method comprising:
   identifying a modulation scheme based on a type of resource blocks, wherein the resource blocks are used for data to be transmitted to a terminal; and
   modulating the data according to the identified modulation scheme,
   wherein, if the type of the resource blocks is continuous resource block (CRB), the modulation scheme is identified as a first modulation scheme, and
   wherein, if the type of the resource blocks is distributed resource block (DRB), the modulation scheme is identified as a second modulation scheme.

2. The method of claim 1, further comprising:
   receiving channel quality information of a first region of the data and non-Gaussian information of a second region of the data,
   wherein the non-Gaussian information indicates whether the base station uses a modulation scheme related to a non-Gaussian distribution or not.

3. The method of claim 2, further comprising:
   identifying a modulation and coding level on the basis of the channel quality information of the first region, the non-Gaussian information of the second region, and the identified modulation scheme.

4. The method of claim 2, further comprising:
   identifying the second region for measuring the non-Gaussian information; and
   transmitting, to the terminal, information for the identified second region.

5. The method of claim 2, further comprising:
   transmitting, to the terminal, a message instructing to identify the non-Gaussian information for the second region.

6. The method of claim 2, wherein the non-Gaussian information of the second region is information indicating a non-Gaussianization level of the second region.

7. The method of claim 1, wherein the identifying of the modulation scheme for the data comprises:
   if the type of the resource blocks is the DRB and a number of resource blocks is more than a threshold, identifying the first modulation scheme;
   if the type of the resource blocks is the CRB and the number of resource blocks is more than a threshold, identifying the first modulation scheme; and
   if the type of the resource blocks is the CRB and the number of resource blocks is less than a threshold, identifying the second modulation scheme.

8. The method of claim 7, wherein the first modulation scheme comprises a Multi-Tone FQAM (MT-FQAM) scheme and the second modulation scheme comprises a Frequency-Quadrature Amplitude Modulation (FQAM) scheme.

9. The method of claim 1, wherein the modulation scheme allows an interference signal to be similar to a non-Gaussian distribution.

10. A method of operating a terminal in a wireless communication system, the method comprising:
    identifying channel quality information of a first region of a signal; identifying non-Gaussian information of a second region of the signal; and
    transmitting, to a base station, the channel quality information of the first region and the non-Gaussian information of the second region,
    wherein the non-Gaussian information indicates whether the base station uses a modulation scheme related to a non-Gaussian distribution or not.

11. The method of claim 10, further comprising:
    receiving, from the base station, information of the second region for identifying the non-Gaussian information.

12. The method of claim 10, wherein the non-Gaussian information of the second region is information indicating a non-Gaussianization level of the second region.

13. The method of claim 10, wherein the non-Gaussian information comprises at least one $\alpha$ and $\beta$ of a probability density function of complex generalized Gaussian (CGG) distribution, and
    wherein $\alpha$ denotes a non-Gaussian level as a shape parameter, and $\beta$ denotes a variance as a scale parameter.

14. A base station apparatus in a wireless communication system, the base station apparatus comprising:
    a Radio Frequency (RF) processor configured to transmit data; and a modem configured to:
      identify a modulation scheme based on a type of resource blocks, wherein the resource blocks are used for data to be transmitted to a terminal, and
      modulate the data according to the identified modulation scheme,
    wherein, if the type of the resource blocks is continuous resource block (CRB), the modulation scheme is identified as a first modulation scheme, and
    wherein, if the type of the resource blocks is distributed resource block (DRB), the modulation scheme is identified as a second modulation scheme.

15. The apparatus of claim 14, wherein the modem is further configured to receive channel quality information of a first region of the data and non-Gaussian information of a second region of the data,
    wherein the non-Gaussian information indicates whether the base station uses a modulation scheme related to a non-Gaussian distribution or not.

16. The apparatus of claim 15, wherein the modem is further configured to identify a modulation and coding level on the basis of the channel quality information of the first region, the non-Gaussian information of the second region, and the identified modulation scheme.

17. The apparatus of claim 15, wherein the modem is further configured to:
- identify the second region for measuring the non-Gaussian information, and
- transmit, to the terminal, information for the identified second region.

18. The apparatus of claim 15, wherein the modem is further configured to transmit, to the terminal, a message instructing to identify the non-Gaussian information for the second region via the RF processor.

19. The apparatus of claim 15, wherein the non-Gaussian information of the second region is information indicating a non-Gaussianization level of the second region.

20. The apparatus of claim 14, wherein the modem is further configured to:
- identify the first modulation scheme if the type of the resource blocks is the DRB and a number of resource blocks is more than a threshold,
- identify the first modulation scheme if the type of the resource blocks is the CRB and the number of resource blocks is more than a threshold, and
- identify the second modulation scheme if the type of the resource blocks is the CRB and the number of resource blocks is less than a threshold.

21. The apparatus of claim 20, wherein the first modulation scheme comprises a Multi-Tone FQAM (MT-FQAM) scheme and the second modulation scheme comprises a Frequency-Quadrature Amplitude Modulation (FQAM) scheme.

22. The apparatus of claim 14, wherein the modulation scheme allows an interference signal to be similar to a non-Gaussian distribution.

23. A terminal apparatus comprising:
- a Radio Frequency (RF) processor configured to receive a signal from a base station; and
- a modem configured to:
  - identify channel quality information of a first region of the signal, and
  - identify non-Gaussian information of a second region of the signal via the RF processor,
- wherein the non-Gaussian information indicates whether the base station uses a modulation scheme related to a non-Gaussian distribution or not.

24. The apparatus of claim 23, wherein the modem is further configured to receive, from the base station, information of the second region for identifying the non-Gaussian information via the RF processor.

25. The apparatus of claim 23, wherein the non-Gaussian information of the second region is information indicating a non-Gaussianization level of the second region.

26. The apparatus of claim 23, wherein the non-Gaussian information comprises at least one $\alpha$ and $\beta$ of a probability density function of complex generalized Gaussian (CGG) distribution, and
- wherein $\alpha$ denotes a non-Gaussian level as a shape parameter, and $\beta$ denotes a variance as a scale parameter.

* * * * *